(12) United States Patent
Feller et al.

(10) Patent No.: US 7,798,520 B2
(45) Date of Patent: Sep. 21, 2010

(54) AIRBAG ARRANGEMENT

(75) Inventors: Jens Feller, Illerkirchberg (DE); Robert Getz, Ulm (DE); Ralf Gutmann, Ulm (DE); Rainer Heuschmid, Ulm (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/318,866

(22) Filed: Jan. 9, 2009

(65) Prior Publication Data

US 2009/0184500 A1 Jul. 23, 2009

Related U.S. Application Data

(63) Continuation of application No. PCT/DE2007/001236, filed on Jul. 9, 2007.

(30) Foreign Application Priority Data

Jul. 11, 2006 (DE) .................. 20 2006 010 878 U

(51) Int. Cl.
*B60R 21/207* (2006.01)
(52) U.S. Cl. ..................... 280/729; 280/730.2
(58) Field of Classification Search ............. 280/730.2, 280/729, 743.1, 742
See application file for complete search history.

(56) References Cited

U.S. PATENT DOCUMENTS

| | | | |
|---|---|---|---|
| 4,966,388 A | 10/1990 | Warner et al. | |
| 5,524,924 A | 6/1996 | Steffens, Jr. et al. | |
| 5,556,128 A | 9/1996 | Sinnhuber et al. | |
| 5,803,485 A | 9/1998 | Acker et al. | |
| 5,913,536 A | 6/1999 | Brown | |
| 5,921,576 A | 7/1999 | Sinnhuber | |
| 6,062,594 A | 5/2000 | Asano et al. | |
| 6,206,411 B1 | 3/2001 | Sunabashiri | |
| 6,349,964 B1 | 2/2002 | Acker et al. | |
| 6,371,513 B1 | 4/2002 | Fujimoto et al. | |
| 6,394,487 B1 | 5/2002 | Heudorfer et al. | |
| 6,508,486 B1 | 1/2003 | Welch et al. | |
| 6,540,253 B2 | 4/2003 | Acker et al. | |
| 6,851,706 B2 | 2/2005 | Roberts et al. | |
| 6,991,257 B2 | 1/2006 | Zhao et al. | |

(Continued)

FOREIGN PATENT DOCUMENTS

DE 195 41 513 A1 5/1996

(Continued)

*Primary Examiner*—Paul N Dickson
*Assistant Examiner*—Joseph Rocca
(74) *Attorney, Agent, or Firm*—Foley & Lardner, LLP

(57) ABSTRACT

An airbag arrangement for a vehicle occupant restraint system includes an airbag on a side of a backrest of a vehicle seat that when inflated first extends substantially in a direction of a vertical vehicle axis and then forward from a backrest in a direction of travel of the vehicle. The airbag includes at least one inflatable chamber extending substantially forward from the backrest in the direction of travel and that is assigned to a body region of a vehicle occupant to support the vehicle occupant in a side collision. The at least one chamber is extended by a section that extends forward in the direction of travel when the airbag is inflated so that the airbag supports the vehicle occupant if vehicle occupant moves obliquely forward in the direction of travel because the section intercepts the associated body region of the vehicle occupant.

12 Claims, 8 Drawing Sheets

U.S. PATENT DOCUMENTS

| | | |
|---|---|---|
| 2005/0062266 A1 | 3/2005 | Steimke et al. |
| 2005/0173900 A1 | 8/2005 | Zhao et al. |
| 2005/0189742 A1 | 9/2005 | Kumagai et al. |
| 2006/0001244 A1* | 1/2006 | Taguchi et al. .............. 280/729 |
| 2006/0022439 A1 | 2/2006 | Bayley et al. |
| 2006/0131847 A1 | 6/2006 | Sato et al. |

FOREIGN PATENT DOCUMENTS

| | | |
|---|---|---|
| DE | 296 14 201 U1 | 11/1996 |
| DE | 195 38 657 A1 | 4/1997 |
| DE | 196 46 698 A1 | 5/1997 |
| DE | 197 04 657 A1 | 8/1997 |
| DE | 197 34 487 A1 | 3/1998 |
| DE | 196 47 611 A1 | 5/1998 |
| DE | 298 22 159 U1 | 6/1999 |
| DE | 199 44 243 A1 | 4/2000 |
| DE | 10 2005 035 753 A1 | 5/2006 |
| EP | 0 847 902 A1 | 4/2003 |
| EP | 0 874 901 B1 | 4/2003 |
| EP | 1 442 946 B1 | 9/2007 |
| WO | WO 2004/026640 A1 | 4/2004 |

* cited by examiner

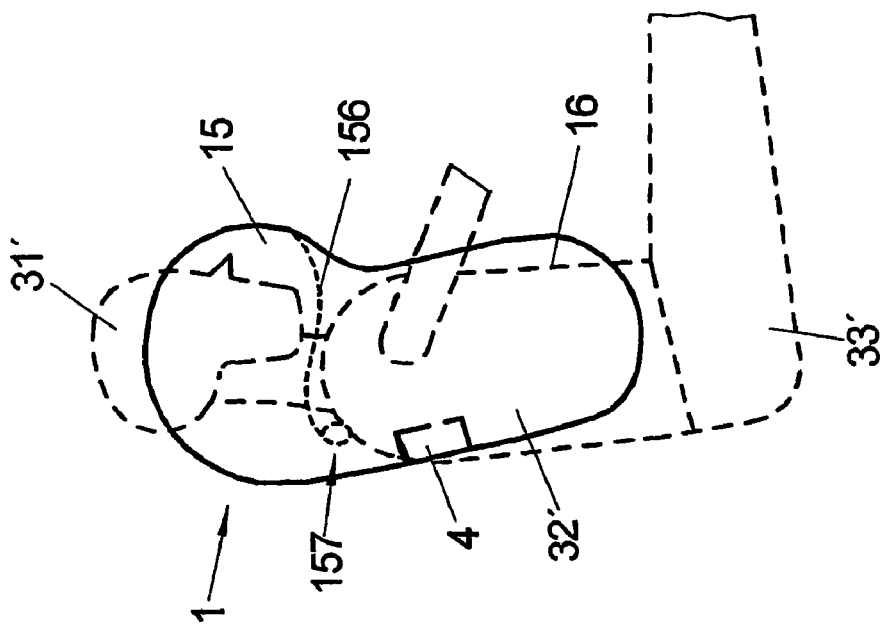
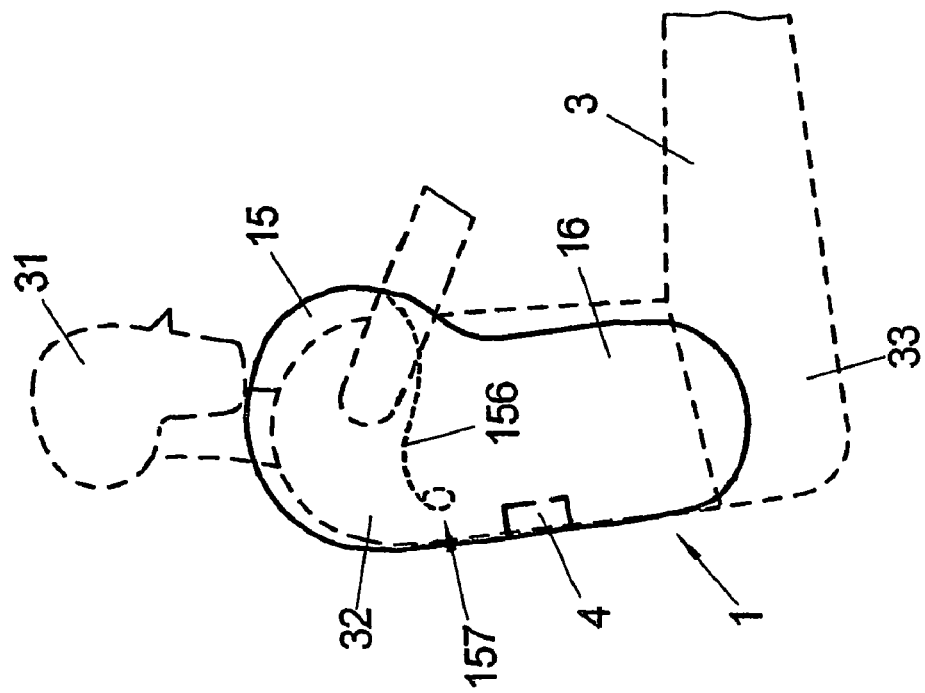

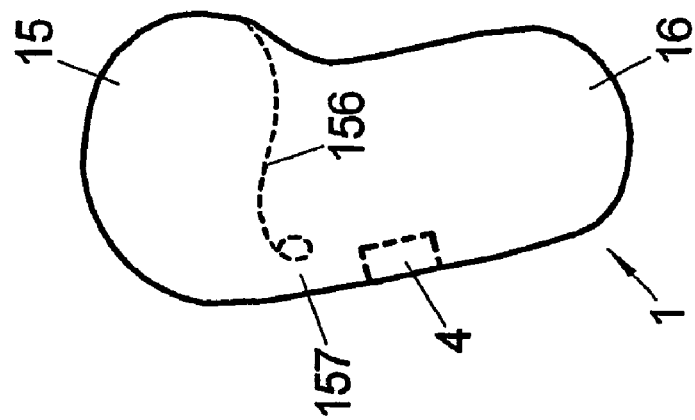
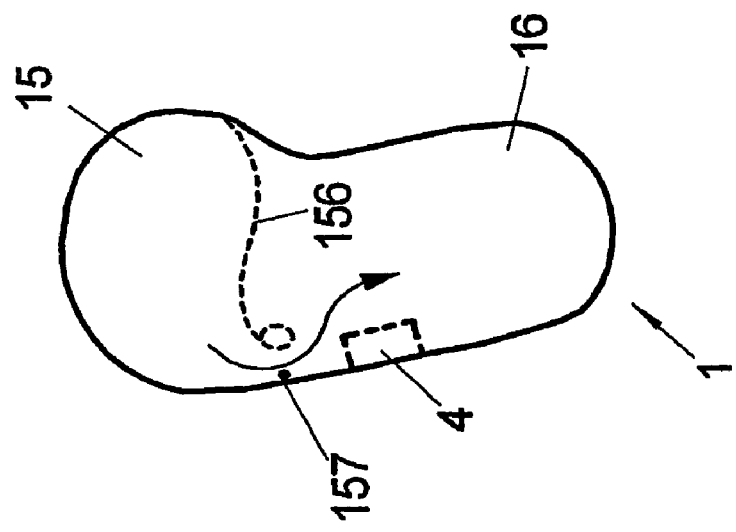
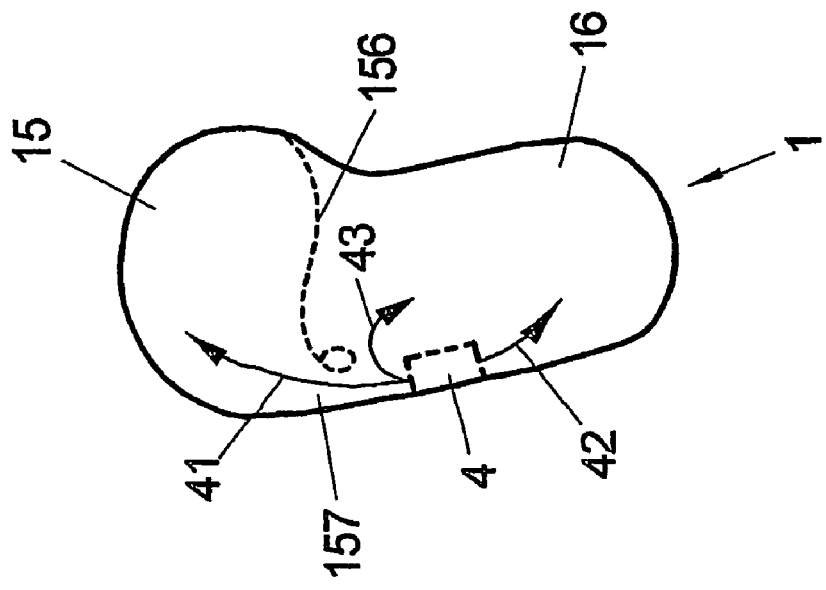

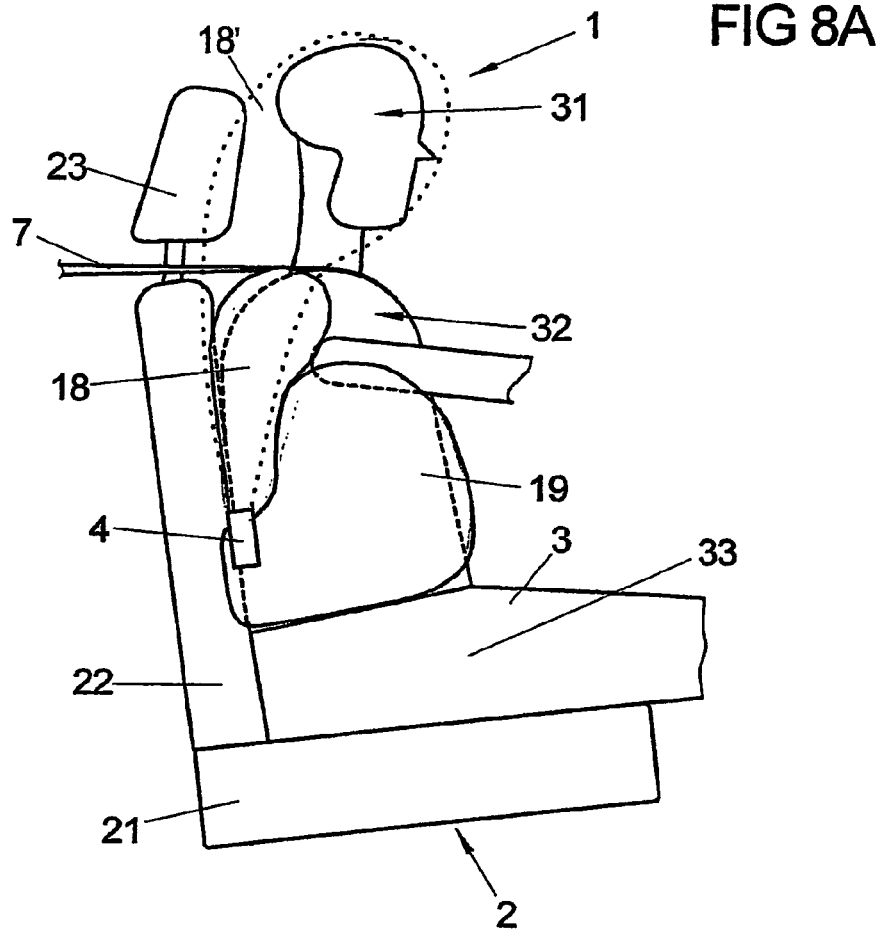
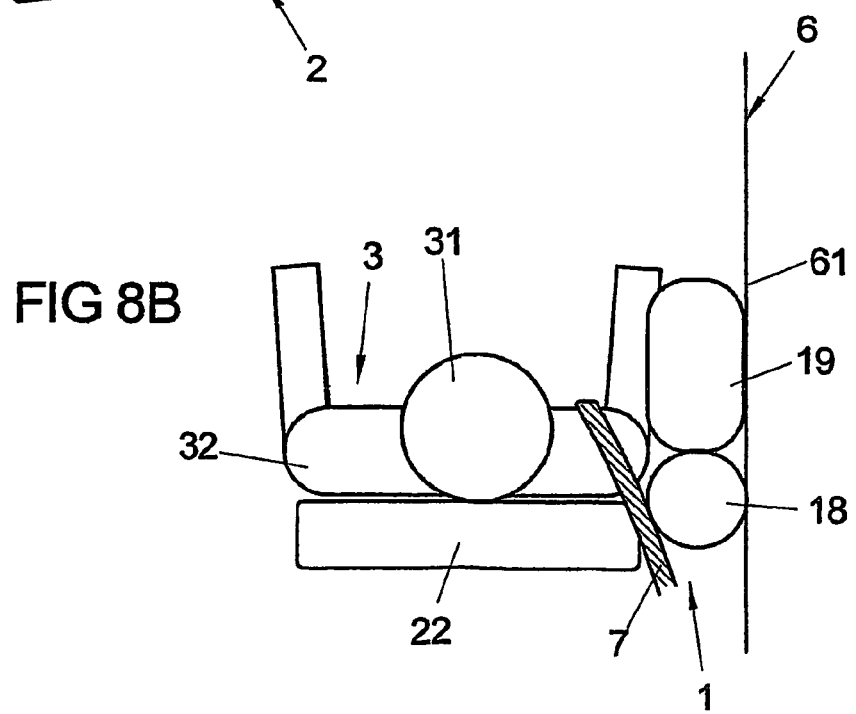

AIRBAG ARRANGEMENT

CROSS-REFERENCE TO RELATED PATENT APPLICATIONS

This application is a Continuation of International Patent Application No. PCT/DE2007/001236, filed Jul. 9, 2007, which was published in German as WO/2008/006350 and is incorporated herein by reference in its entirety.

BACKGROUND

The present application relates to an airbag arrangement for a vehicle occupant restraint system. The airbag arrangement includes an airbag arranged on a side of a backrest of a vehicle seat in such a way that when inflated the airbag extends substantially vertically along the backrest and forward in a direction of travel of the vehicle. The airbag may be divided into separate inflatable chambers, each of which is assigned to different body regions of a vehicle occupant, for example the head and the thorax. The chambers are configured to support the vehicle occupant in the event of a side collision of the vehicle. The airbag arrangement may be used as part of a vehicle occupant restraint system and arranged to be folded up laterally in or on the backrest in a normal non-activated state. The airbag arrangement is inflated in the event of a collision of the vehicle and unfolded. The airbag arrangement then extends in an unfolded state to a side of the vehicle seat to intercept and support a lateral movement of the vehicle occupant as a result of the collision.

SUMMARY

One embodiment of the disclosure relates to an airbag arrangement for a vehicle occupant support system. The airbag arrangement includes an airbag on a side of a backrest of a vehicle seat in such a way that when inflated the airbag first extends in a direction of a vertical vehicle axis and then extends forward from the backrest in the direction of travel of the vehicle. The airbag includes at least two separate inflatable chambers spaced apart with respect to the vertical vehicle axis. The inflatable chambers at least partially form an intermediate space. Each inflatable chamber extends forward from the backrest in the direction of travel and is assigned to a body region of a vehicle occupant to support the vehicle occupant in the event of a side collision.

The chambers each include a section when the airbag is inflated that extends forward in the direction of travel so that the airbag supports a vehicle occupant if the vehicle occupant moves obliquely forward in the direction of travel. The section intercepts an associated body region of the vehicle occupant. The chambers are connected to one another in a connecting region that permits an exchange of gas between the chambers.

An upper one of the chambers includes a first connecting section adjoining the connecting region. The first connecting section is located at a front of the upper chamber in the direction of travel and at a bottom of the upper chamber along the vertical vehicle axis. A lower one of the chambers includes a second connecting section adjoining the first connecting section. The second connecting section located at a front of the lower chamber in the direction of travel and at a top of the lower chamber along the vertical vehicle axis. The chambers are supported against one another via the first and second sections to minimize an intermediate space between the chambers.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 5a and 5b are schematic side views of an airbag with a chamber configured to support a shoulder of a large vehicle occupant and a head of a small vehicle occupant according to an exemplary embodiment;

FIGS. 6a-6c are schematic views of first, second, and third phases of inflation of the airbag of FIGS. 5a and 5b according to an exemplary embodiment;

FIGS. 8a and 8b are a schematic side view and a plan view of an airbag of a thorax module according to an exemplary embodiment.

DETAILED DESCRIPTION

Figure 1A:
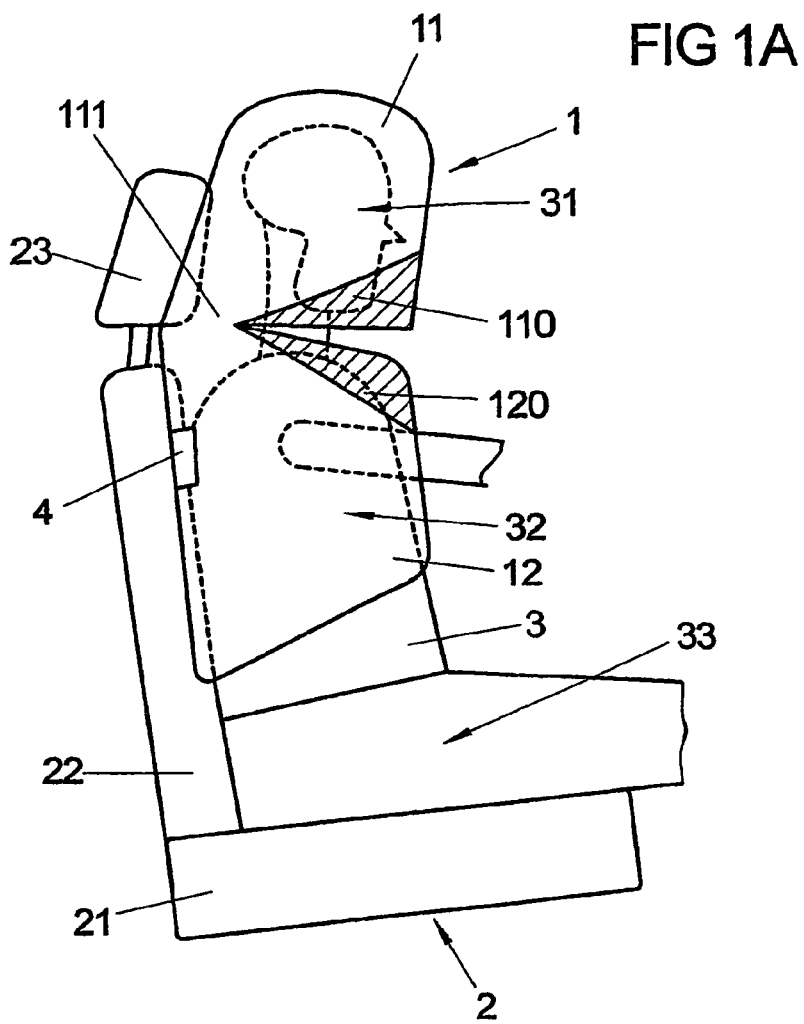
FIG. 1a is a schematic side view of an airbag arrangement on a side of a backrest of a vehicle seat according to an exemplary embodiment.

An airbag arrangement for a vehicle occupant restraint system includes an airbag arranged on a side of a backrest of a vehicle seat that when inflated first extends substantially in a direction of a vertical vehicle axis and then extends forward from a backrest in a direction of travel of the vehicle. The airbag includes at least one inflatable chamber that extends substantially forward proceeding from the backrest in the direction of travel and that is assigned to a body region of a vehicle occupant to support the vehicle occupant in the event of a side collision. According to one exemplary embodiment, the at least one chamber is extended by a section that extends forward in the direction of travel when the airbag is inflated in such a way that the airbag supports the vehicle occupant in the event the vehicle occupant moves obliquely forward in the direction of travel because the section intercepts the associated body region of the vehicle occupant.

According to some exemplary embodiments, the airbag arrangement may be of the type disclosed in DE 196 47 611 A1, which is herein incorporated by reference in its entirety. A side airbag module for attaching in a side region of a vehicle seat includes two separate airbags that are inflated by a common gas generator using a gas flow splitter. The first airbag supports the head region of a vehicle occupant while the second airbag covers the thorax region of the vehicle occupant. An airbag arrangement that includes two airbags folded independently of one another may have an advantageous unfolding behavior with regard to direction, speed, and pressure distribution in the event of a side crash.

Airbags with individual chambers can be adapted in terms of their gas pressure and their shape for different body regions of a vehicle occupant. Partitioning into chambers that are adapted in a targeted fashion to the body regions of a vehicle occupant has the advantage that no large-volume airbags may be necessary for complete coverage of the vehicle occupant, but rather support can be provided in the relevant regions with small-volume chambers. To keep the gas volume required for inflating the chambers as low as possible, the individual chambers may be arranged spatially separate from one another and offer targeted support for certain body regions of the vehicle occupant.

The use of separate chambers for supporting different body regions of the vehicle occupant may allow gaps to form between the chambers of the airbag and the vehicle occupant may not be supported in those regions. Furthermore, the use of individual chambers maybe disadvantageous for stability and positioning accuracy of the airbag when unfolded.

Airbag arrangements that must be attached laterally to a backrest may not equally support vehicle occupants of different body sizes. In different accident situations, the individual chambers of the airbag may not optimally support the body regions to which they are assigned. In the case of a collision of the vehicle oblique to the front in the direction of travel, the airbag arranged laterally on the backrest may provide inadequate support for vehicle occupants of small body size because, for example, the head of the small vehicle occupant may be situated in a region between the chamber of the airbag configured to support the head and the chamber of the airbag configured to support the thorax. This is because the design and configuration of the individual chambers of the airbag are generally for an average vehicle occupant and optimum support may not be provided for a relatively small or relatively large vehicle occupant. In the event of an oblique collision of the vehicle from the front in the direction of travel, the head of a vehicle occupant may turn and approach the vehicle body or a part of the vehicle body in an oblique direction and not be supported or be supported to an insufficient extent by chambers that are not designed for such an accident.

According to various exemplary embodiments, an airbag arrangement may ensures optimum support for vehicle occupants of different body sizes in various accident situations and may ensure that a small gas volume is needed for inflation of the airbag.

According to an exemplary embodiment, the airbag arrangement has an airbag that is arranged laterally on a backrest of a vehicle seat and that when inflated first extends substantially in the direction of the vertical vehicle axis and then extends forward from the backrest in the direction of travel of the vehicle. The airbag has at least one inflatable chamber that extends substantially forward from the backrest in the direction of travel and that is assigned to a body region of a vehicle occupant to support the vehicle occupant in the event of a side collision. When the airbag is inflated, the chamber of the airbag is extended by a section that extends forward in the direction of travel so the airbag supports the vehicle occupant, even in the event the vehicle occupant moves obliquely forward in the direction of travel, because the section intercepts the associated body region of the vehicle occupant.

According to an exemplary embodiment, the section of the chamber may be an additional section of the chamber. The additional chamber section extends in such a way when the airbag is inflated that the airbag supports the vehicle occupant even in the event the vehicle occupant moves obliquely forward, for example as a result of an oblique collision of the vehicle. The section may either be an integral part of the chamber or formed as a separate additional chamber that is connected to the chamber.

According to an exemplary embodiment, the airbag may have at least two separate Inflatable chambers that each extend substantially forward from the backrest in the direction of travel. The two chambers are each assigned to a body region of a vehicle occupant to support the vehicle occupant in the event of a side collision. At least one of the chambers may be extended by a section that when the airbag is inflated extends forward in the direction of travel in such a way that the airbag supports the vehicle occupant even in the event the vehicle occupant moves obliquely forward in the direction of travel, because the section intercepts the associated body region of the vehicle occupant.

The chambers may be matched to each other so that an intermediate space between the chambers is substantially closed by the extension sections in the inflated state of the chambers. The chambers may be advantageously supported against each other via the extension sections so that a gap between the chambers is closed and the chambers stabilize one another.

According to various exemplary embodiments, the airbag may ensure reliable support for vehicle occupants in different accident situations regardless of body size. In order to ensure reliable support for different accident situations and vehicle occupants of different body size, the chambers of the airbag may be adapted to the accident situations and different body sizes and coordinated with one another in a targeted fashion. At least one of the chambers of the airbag is extended by a section extending forward in the direction of travel to adapt the airbag so it ensures reliable support for vehicle occupants of different body size. The at least one chamber also intercepts the occurring movements of the vehicle occupant as a result of an oblique collision. The extension of the chambers is carried out in a targeted fashion and therefore a large-volume airbag can be avoided using a section integrally formed in the airbag and adapted to the accident situation and the possible body sizes of the vehicle occupant. The section may be formed either as an integral part of the chamber or as a separate additional chamber connected to the chamber.

According to an exemplary embodiment, the airbag arrangement may include a head-thorax module in which the shape and pressure of one chamber is configured to support the head and the shape and pressure of another chamber is configured to support the thorax of the vehicle occupant. According to another exemplary embodiment, the airbag arrangement may include a thorax-pelvis module with one chamber for supporting the thorax and another chamber for supporting the pelvis. According to another exemplary embodiment, the airbag arrangement may include a head-thorax-pelvis module with one chamber for supporting the head, one chamber for supporting the thorax, and one chamber for supporting the pelvis of a vehicle occupant.

According to some exemplary embodiments including a head-thorax module or a head-thorax-pelvis module, the chamber for supporting the head may be extended by a section at a front of the chamber in the direction of travel and at a bottom of the chamber along the vertical vehicle axis so that the head of a vehicle occupant is supported in the event of a collision of the vehicle obliquely from the front in the direction of travel.

According to another exemplary embodiment, the chamber of the airbag configured to support the thorax may additionally or alternatively be extended by a section at the front in the direction of travel and at a top of the chamber along the vertical vehicle axis so that the shoulder of the vehicle occupant is supported in the event of a collision of the vehicle obliquely from the front in the direction of travel. The extension or section of the chamber for supporting the head or for supporting the thorax allow the gaps formed between the individual chambers to be relatively small. For example, the chamber for supporting the head and/or the chamber for supporting the thorax may be extended in such a way that when the airbag is inflated, the chambers are supported against one another and no gaps are formed between the chambers despite the chambers being formed individually and substantially separate from one another. Such an airbag arrangement may ensure that a vehicle occupant is reliably supported regardless of their body size, in particular a small vehicle occupant whose head is arranged at a level between the chambers of the airbag, may be reliably supported.

According to an exemplary embodiment, the chambers of the airbag may be advantageously arranged vertically one above the other along the vertical vehicle axis. According to another exemplary embodiment, the chambers may have a hose-like design and be arranged adjacent to one another in a hose-like manner and may be coiled at least in sections.

According to an exemplary embodiment, the airbag arrangement may include an airbag with at least two chambers configured in shape and gas pressure for different body regions of a vehicle occupant. The chambers may be formed individually and each be assigned to a body region and may provide support for only the assigned body region. To ensure that the airbag and its individual chambers meets the demands of stability and positioning accuracy, at least one connecting element may be provided between the individual chambers. Each connecting element connects two chambers of the airbag to one another and when the airbag is inflated to stabilize the chambers in the event of a vehicle collision. According to an exemplary embodiment, the connecting element preferably engages the extension sections of the chambers.

According to one exemplary embodiment, the connecting element may be formed at least in sections by a planar layer that connects two chambers of the airbag to one another in the shape of a sail such that the spatial distance between the chambers is limited by the connecting element. Instead of or in addition to the planar layer, the connecting element may also be formed in sections by a small-volume inflatable chamber that connects the chambers, which are designed to support the body regions of the airbag to one another.

The connecting element may preferably be configured in the inflated state so that the connecting element is braced between the shoulder of the vehicle occupant and a part of a vehicle body to stabilize the at least two chambers connected by the connecting element in their position. Such a configuration of the connecting element may be particularly advantageous if the assembled and inflated airbag extends between the vehicle seat and a vehicle door as part of the vehicle body. In the event of a collision the connecting element, which itself is preferably formed as an inflatable chamber, can then be braced by the shoulder of the vehicle occupant facing toward the vehicle door so that the chambers of the airbag are fixed in their position relative to the vehicle door.

According to another exemplary embodiment, at least one chamber of the airbag may be configured to have a dual use for supporting the thorax of a large vehicle occupant and for supporting the head of a small vehicle occupant. This exemplary embodiment may provide the advantage that the airbag arrangement can be optimally adapted to vehicle occupants of different body sizes.

The airbag arrangement may be configured so the airbag is inflated in a first phase so that the gas pressure is greater in a first chamber than in a second chamber of the airbag during the first phase. In the first phase, the first chamber of the airbag serves to support the thorax, in particular the shoulder, of a large vehicle occupant in the event of a collision of the vehicle.

According to an exemplary embodiment, an airbag arrangement for a vehicle occupant restraint system is arranged on the side of a backrest of a vehicle seat in such a way that when inflated, the airbag first extends substantially in the direction of the vertical vehicle axis and then forward from the backrest in the direction of travel of the vehicle. The airbag arrangement has at least two separate inflatable chambers that each extend substantially forward from the backrest in the direction of travel and that are each assigned to a body region of a vehicle occupant to support the vehicle occupant in the event of a side collision.

A first chamber of the airbag may be configured to support a body region of the vehicle occupant and to inflate the airbag in a first phase in such a way that the gas pressure is greater in the first chamber than in a second chamber of the airbag.

Particularly, the first chamber of the airbag may be configured to support the thorax in the case of a large vehicle occupant (e.g., a shoulder of the occupant) and/or to support the head in the case of a small vehicle occupant.

In a synergetic dual use, the first chamber of the airbag is preferably configured to support the thorax of a large vehicle occupant and to support the head of a small vehicle occupant because the gas pressure is greater in the first chamber than in the second chamber of the airbag during the first phase.

To inflate the airbag, the airbag arrangement includes a gas generator that generates a gas jet so that in the first phase of the inflation, an increased gas pressure is produced in the first chamber. The gas generator may generate both a first gas jet for inflating the first chamber and also a second gas jet for inflating the second chamber with the first gas jet having a more intense or greater gas flow than the second gas jet such that the gas pressure generated in the first chamber is greater than that generated in the second chamber.

The airbag arrangement may be advantageously configured to equalize the difference in the gas pressure between the first chamber and the second chamber in a second phase that takes place after the first phase in terms of time. The airbag arrangement may have a connecting opening between the first chamber and the second chamber of the airbag to equalize the pressure difference between the first chamber and the second chamber in the second phase after the inflation of the airbag by the gas generator. In a third phase following the second phase, the gas pressure in the first chamber and in the second chamber is equal and the first chamber is adapted in terms of its gas pressure such that the first chamber may support the head of a small vehicle occupant.

In the dual use of the first chamber of the airbag to support the thorax (e.g., in particular the shoulder of a large vehicle occupant) and the head of a small vehicle occupant, the thorax or the shoulder of a vehicle occupant in the normal seated position of the vehicle occupant is generally closer to the airbag arrangement or the vehicle body. In the event of a collision, the contact between the shoulder or the thorax of the vehicle occupant and the airbag arrangement takes place earlier than the contact between the head of the vehicle occupant and the airbag arrangement. As a result, the airbag or a chamber of the airbag may be adapted to support the shoulder or the thorax of a vehicle occupant in a first or early phase of a collision and to support the head in a second or later phase without the supportive action of the airbag or the chamber of the airbag for the shoulder or for the head being noticeably impaired. The first chamber of the airbag is adapted in a first phase with a high gas pressure to support the thorax or the shoulder of a large vehicle occupant and in a later phase by pressure equalization with the second chamber and the resulting pressure reduction in the first chamber to support the head of a relatively small vehicle occupant. Therefore, if the vehicle seat is occupied by a large vehicle occupant whose shoulder is situated at the level of the first chamber, the shoulder of the vehicle occupant is reliably supported in the event of a collision. In the event of the vehicle seat being occupied by a small vehicle occupant whose head is situated at the level of the first chamber, the head of the small vehicle occupant is supported by the first chamber.

According to some exemplary embodiments, an airbag having a first and a second chamber may have a third chamber configured to support the pelvis of a large or small vehicle occupant. The third chamber extends below the first and second chambers of the airbag and may be filled with an increased gas pressure in the first phase of the inflation similar to the first chamber. The gas pressure is then equalized in the second phase such that in a third phase, an equal gas pressure prevails in all three chambers of the airbag.

Figure 1B:
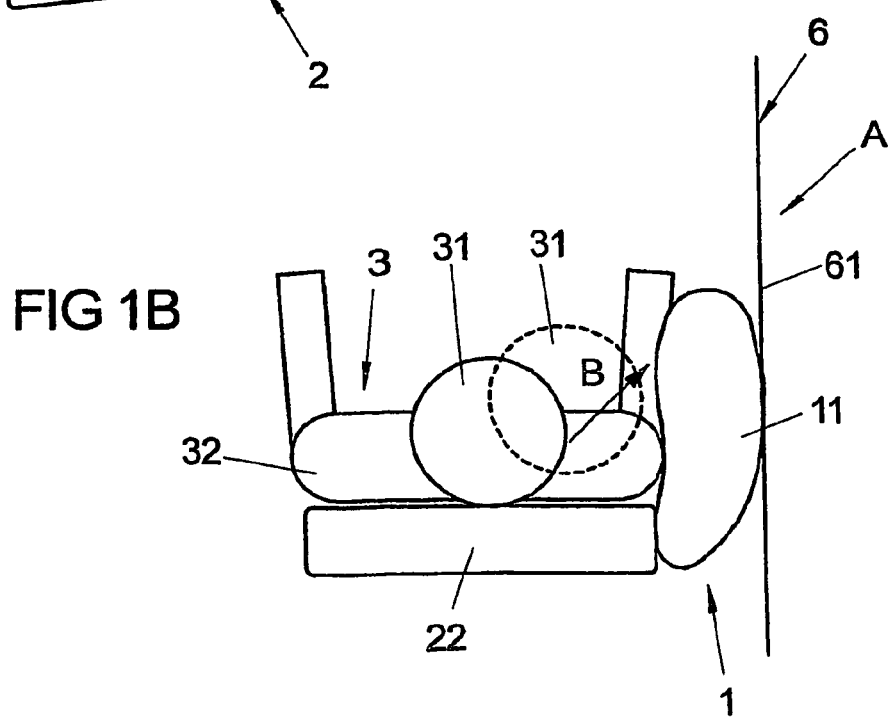
FIG. 1b is a schematic plan view of the airbag arrangement of FIG. 1a on the side of the backrest of the vehicle seat according to an exemplary embodiment.

FIGS. 1a and 1b show a vehicle seat 2 having a seat portion 21 and a backrest 22. On the upper end of the backrest 22 is arranged a headrest 23. A side of the backrest has an airbag arrangement with an airbag 1 that is divided into chambers 11, 12 and includes a gas generator 4 for inflating the airbag 1.

The airbag 1 is folded in a normal, non-activated state for arrangement in the backrest 22 and is, for example, arranged in a housing in or on the backrest 22. In the event of a vehicle collision, the gas generator 4 is activated by a sensor device and inflates the airbag 1 such that the airbag 1 is unfolded and, as illustrated in FIG. 1b, extends from the backrest 22 to the side of the vehicle seat 2 between the vehicle seat 2 and the vehicle body 6, particularly a vehicle door and a door breastwork 61. The airbag 1 is illustrated in its unfolded state, for example after inflation in the event of a collision.

The airbag 1 illustrated in FIG. 1a and 1b forms a head-thorax module for supporting the head 31 and the thorax 32 of a vehicle occupant 3. For this purpose, the airbag 1 includes a chamber 11 configured to support the head 31 and a chamber 12 configured to support the thorax 32.

Both the chamber 11 configured to support the head 31 and the chamber 12 configured to support the thorax 32 are extended by sections 110, 120 in such a way that the chambers 11, 12 support the vehicle occupant 3 in the event of a collision oblique to the front of the vehicle in the direction of travel and are adapted to different body sizes of different vehicle occupants. A lower, front section 110 is integrally formed on the chamber 11 and intercepts a movement of the head 31 in a movement direction B of the vehicle occupant 3 in the event of a collision A obliquely from the front, as per FIG. 1b. The chamber 12 also includes a front, upper section 120 such that the gap between the chamber 11 and the chamber 12 of the airbag 1 is virtually closed in the inflated state.

The extension of the chambers 11, 12 by the sections 110, 120 causes a vehicle occupant 3 to be supported both in the event of a side collision and in the event of a collision oblique to the front of the vehicle in the direction of travel. FIG. 1b illustrates a position of the head 31 of a vehicle occupant 3 as a result of a collision A that takes place in the direction of the arrow and that causes a movement of the head in the movement direction B. The extension of the chambers 11, 12 may ensure that the head of the vehicle occupant 31 cannot move past the airbag 1 in the direction of the vehicle body 6 in the event of an oblique collision A, but rather the head is intercepted by the front extension sections 110, 120 before the head 31 or thorax 32 can impact against the vehicle body 6.

The extension of the chambers 11, 12 into the sections 110, 120 may ensure that the airbag 1 provides sufficient support for relatively small vehicle occupants, for example vehicle occupants smaller than the vehicle occupant 3 illustrated in FIGS. 1a and 1b. In particular, the extensions of the chambers 11, 12 may provide sufficient support for a vehicle occupant whose head is arranged at a level between the chamber 11 and the chamber 12. The chambers 11, 12 are virtually or at least partially closed by the extensions of the chambers 11, 12 into the sections 110, 120 and the head of a small vehicle occupant can be intercepted by the chambers 110, 120. Preferably, the chambers 11, 12 are supported with extension sections 110, 120 against one another such that the intermediate space between the chambers 11, 12 is minimized and the airbag 1 is simultaneously stabilized.

In the airbag 1 illustrated in FIGS. 1a and 1b, the chambers 11, 12 are formed individually and are connected to one another in a connecting region 111 in such a way that the gas generator 4 inflates both chambers 11, 12 in the event of a collision. The connecting region 111 is formed as an internal passage opening through which gas can flow between the chambers 11, 12 to equalize pressure between the chambers 11, 12. The gas generator 4 may be arranged directly in the connecting region 111 between the chambers 11, 12 and the chambers 11, 12 may be filled separately from one another. The gas generator 4 may then close off the connecting region 111 in a pressure-tight manner and place the chambers 11, 12 at different gas pressures because of separate filling of the chambers.

The chambers 11, 12 of the airbag 1 are each assigned to a body region of the vehicle occupant 3 based on their shape and their gas pressure in the inflated state. The chamber 11 is assigned to the head 31 of the vehicle occupant 3, while the chamber 12 is for supporting the thorax 32 of the vehicle occupant 3. The targeted adaptation of the chambers 11, 12 to different body regions (specifically the head 31 and the thorax 32 of the vehicle occupant 3) and to the vehicle occupant 3 may eliminate a need for a large-area airbag and provide reliable support. For purposes of this disclosure, consideration is first given to an average vehicle occupant 3, a so-called 50% dummy or 50th percentile crash dummy with average body dimensions.

In the extensions of the chambers (sections 110, 120), the chambers 11, 12 are adapted so vehicle occupants of other body sizes are also supported, but the volume of the chambers 11, 12 is enlarged only to the extent necessary to ensure support. The design of the chambers 11, 12 is adapted in a targeted fashion to body regions and the extension into the sections 110, 120 is carried out in a targeted fashion such that vehicle occupants of different body size are also supported to an equal degree in the event of an oblique collision. The extension sections 110, 120 may be convexities or integrally formed portions on the chambers 11, 12 or by separate, independent, small volume chambers.

The stability and positioning accuracy of the airbag 1 that can be obtained in the unfolded, inflated state is restricted because a connection between the individual chambers 11, 12 of the airbag 1 is produced only in a very narrow connecting region (e.g., in the case illustrated in FIGS. 1a and 1b, in the connecting region 111) and the chambers 11, 12 are therefore not fixed in terms of their position relative to one another.

Figure 2:
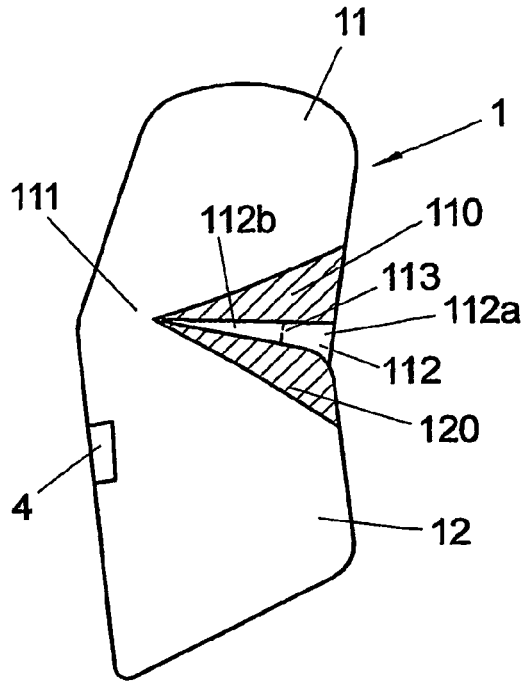
FIG. 2 is a schematic side view of an airbag of a head-thorax module having a connecting element for connecting two chambers of the airbag according to an exemplary embodiment.

As illustrated in FIG. 2, a connecting element 112 is provided between the chambers 11, 12 of the airbag 1 to increase the stability of the airbag 1 in the event of a collision. The connecting element 112 connects the chambers 11, 12 to one another in such a way that the relative movement of the chambers 11, 12 is restricted. The connecting element 112 is formed in one section as a planar layer 112b that has the shape, for example, of a sail and that may be produced from a single-layer material. The connecting element 112 also has a chamber 112a that is separated from the planar layer 112b by a seam 113.

The airbag 1 and the chambers 11, 12 are stabilized to be substantially fixed in position in the event of a collision by the connecting element 112. The chamber 112a may be configured so that in the event of a collision the shoulder of a vehicle occupant comes into contact with the chamber 112a and braces the chamber 112a against the vehicle body or a part of the vehicle body.

Figure 3:
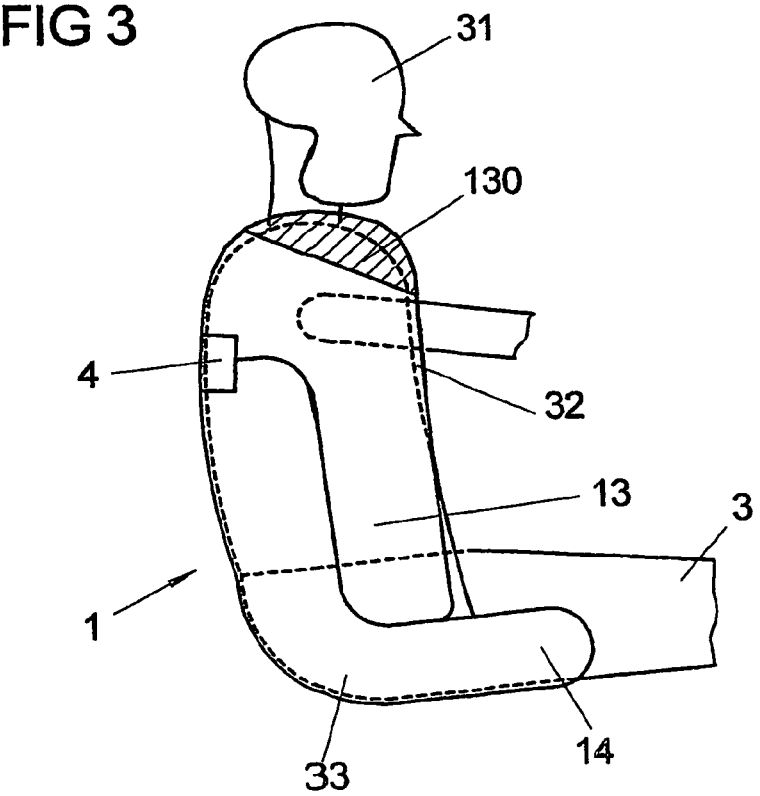
FIG. 3 is a schematic side view of an airbag of a thorax-pelvis module according to an exemplary embodiment.

FIG. 3 illustrates another exemplary embodiment of an airbag 1. For simplicity and clarity, similar components with similar functions are described here and below with the same reference symbols. The airbag 1 forms a thorax-pelvis module and has a chamber 13 configured to support the thorax and a chamber 14 configured to support the pelvis. The chambers 13, 14 are filled and inflated by a common gas generator 4 in the event of a collision. The chambers 13, 14 are of hose-like design and run adjacent to one another so that in the event of a collision the thorax 32 and pelvis 33 of a vehicle occupant 3 are covered and supported so the thorax 32 and the pelvis 33 cannot come into contact with the vehicle body.

The chamber 13 configured to support the thorax 32 of the vehicle occupant 3 is extended by an upper, front section 130 so the shoulder of the vehicle occupant 3 is supported and intercepted in the event of a side collision of the vehicle or a collision oblique to the front of the vehicle in the direction of travel. The extension of the chamber 13 by the section 130 may also support the head of a small vehicle occupant and therefore intercept the movement of the head in the event of a collision of the vehicle so that the head is prevented from coming into contact with the vehicle body or with a part of the vehicle body.

FIGS. 8a and 8b illustrate another exemplary embodiment of an airbag 1 of a thorax module. A thorax module of a side airbag may primarily supports a rib region of a vehicle occupant in the event of a side collision. If the region of action of the side airbag is extended to the shoulder region, the loading in the rib region can be further reduced. The airbag 1 includes two chambers 18, 19. The chamber 19 supports the rib region of the thorax 32 of an average vehicle occupant 3 and the chamber 18 extends into the shoulder region of the vehicle occupant 3 and may ensure additional support in the region of the shoulder. Extending the chamber 18 upward as illustrated by the dashed lines in FIG. 8A as chamber 18' provides head support for small, average, or large vehicle occupants for a side collision (e.g., that takes place transversely with respect to the vehicle longitudinal axis) or oblique collision.

The chamber 18 or 18' forms an extension section and extends the volume of the airbag 1 to the shoulder region to reduce the loading in the rib region of the vehicle occupant 3 in the event of a collision. The chambers 18 or 18' and 19 are formed separately, are arranged to the side of the backrest 22, and when inflated extend between the backrest 22, the vehicle occupant 3, and the door breastwork 61 to support the vehicle occupant 3 with respect to the door breastwork 61. The chambers 18 or 18' and 19 are arranged so a safety belt 7 that supports the vehicle occupant 3 in the vehicle seat 2 extends between the vehicle occupant 3 and the airbag 1 when the airbag 1 is inflated and therefore does not hinder the unfolding of the airbag 1.

The chamber 19 of the airbag 1 is configured so an average vehicle occupant 3 is supported in the rib region by the chamber 19. The extension chamber 18, in contrast, covers the shoulder region of the vehicle occupant 3 to the side and supports the thorax 32 primarily in the region of the shoulder. In the event of a collision, the forces from the collision are introduced into the airbag 1 primarily via the shoulders and the rib region may be relieved of at least some load.

Figure 9:
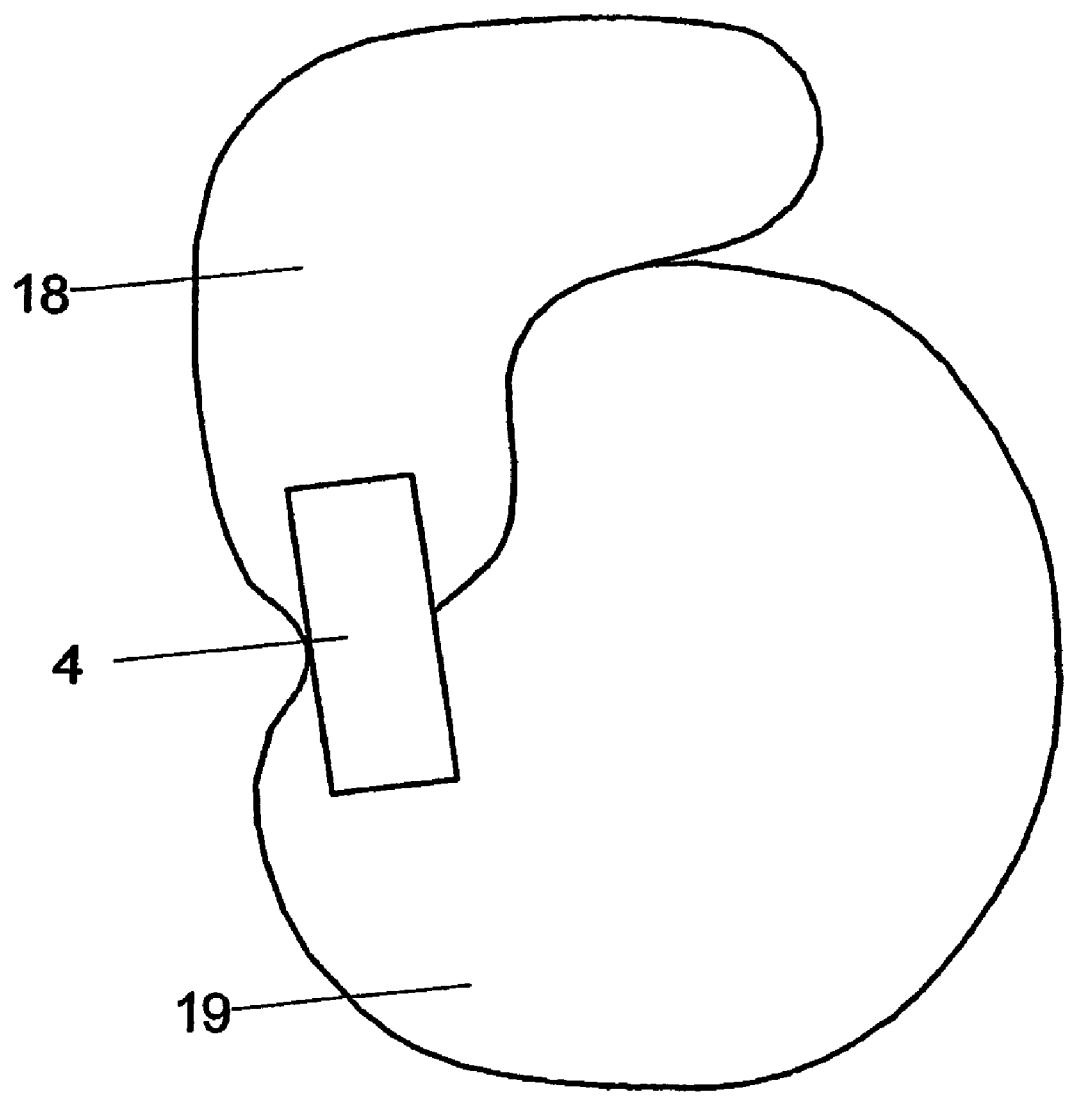
FIG. 9 is a schematic side view of an airbag of a thorax module according to another exemplary embodiment.

According to an exemplary embodiment illustrated in FIG. 9, the extension chamber 18 extends forward and upward in the direction of travel so the head of a small vehicle occupant or the shoulder is more reliably supported in the event of an oblique collision.

The gas pressures of the chambers 18 or 18' and 19 can be adapted in a targeted fashion to the associated body regions to obtain an optimum adaptation of the chambers 18 or 18' and 19 to the body regions to be supported. The gas pressure in the chamber 18 or 18' assigned to the shoulder region of the vehicle occupant 3 may be configured to be greater than in the lower chamber 19 assigned to the rib region to reliably support the forces introduced by the shoulder.

Figure 4:
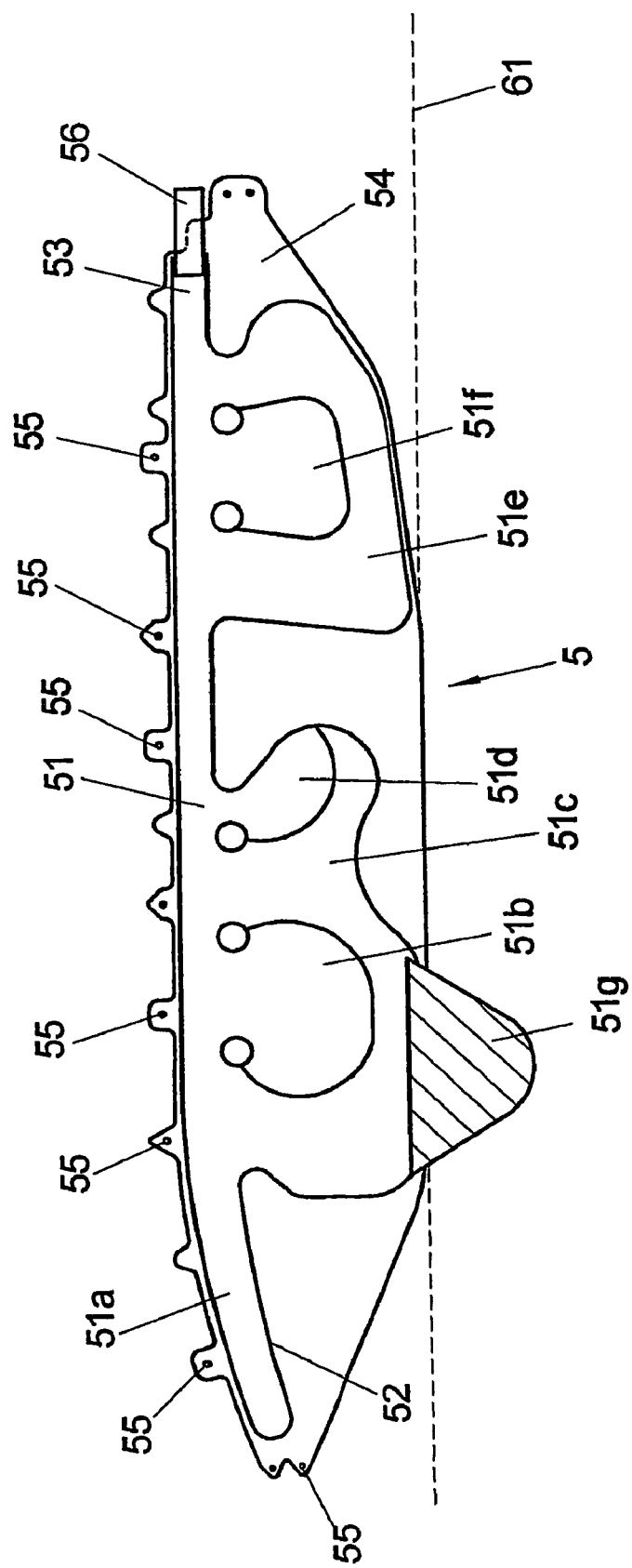
FIG. 4 is a schematic side view of an airbag of an airbag module in a door breastwork according to an exemplary embodiment.

The airbag module may be arranged in a region of the door breastwork 61 above the vehicle door in addition to or instead of an airbag arrangement arranged on the side of the backrest 22 to support the head of a large vehicle occupant. In the event of a collision, the airbag may unfold and inflate in a vertically downward direction in relation to the vertical vehicle axis and cover the door breastwork 61 to prevent or reduce contact of the head of a large vehicle occupant with the door breastwork 61. An example of such an airbag module is illustrated in FIG. 4. The airbag module includes an airbag 5 with chambers 51a to 51g that are separated from one another by seams 52. The airbag 5 is filled and inflated by a gas generator 56 through a filling opening 53 and when inflated covers the door breastwork 61. The airbag 5 includes a material layer 54 that connects the chambers 51a to 51g to one another and stabilizes the airbag 5 in the unfolded state. The material layer 54 is fastened to the door breastwork 61 by lugs 55.

The airbag 5 includes a chamber 51g that extends downward beyond the door breastwork 61 into the region of the vehicle door or of a window opening of the vehicle door. The extended chamber 51g of the airbag 5 may provide effective support of the head of a vehicle occupant in the event of a side or oblique collision of the vehicle.

The airbag module may ensure reliable support for large vehicle occupants. However, for small vehicle occupants whose head is arranged below the chambers 51a to 51g and below the extended chamber 51g, the airbag module may provide inadequate support because the head of a small vehicle occupant may not be intercepted and could come into contact with the vehicle body or door.

FIGS. 5a and 5b illustrate an airbag arrangement that is configured as a thorax module for an average or large vehicle occupant 3 and is also configured as a head-thorax module for a small vehicle occupant 3'. The airbag arrangement according to FIGS. 5a and 5b includes an airbag 1 with two chambers 15, 16 that are separated from one another by a seam 56 and that are filled by a common gas generator 4. For a large vehicle occupant 3, the upper chamber 15 of the airbag 1 extends in the region of the shoulder of the vehicle occupant 3 while the lower chamber 16 covers the thorax 32 of the vehicle occupant 3 when the airbag 1 is inflated. In contrast, for a small vehicle occupant 3' as illustrated in FIG. 5b, the upper chamber 15 covers the head 31' of the vehicle occupant 3' while the lower chamber 16 extends over the entire region of the thorax 32' of the small vehicle occupant 3'. The airbag 1 of FIGS. 5a and 5b is configured to support both the thorax 32 of a large vehicle occupant 3 and the head 31' and the thorax 32' of a small vehicle occupant 3'.

The mode of operation of such a dual-use airbag 1 is schematically illustrated in FIGS. 6a to 6c. The inflation process of the airbag 1 can be divided into three different phases. The airbag 1 is inflated in a first phase illustrated in FIG. 6a. A pressure equalization takes place between the chambers 15, 16 of the airbag 1 in a second phase illustrated in FIG. 6b. The gas pressure P in the chambers 15, 16 is equalized in a third phase illustrated in FIG. 6c. The airbag 1 is configured so that in the first phase, the shoulder region of a large vehicle occupant 3 as per FIG. 5a can be intercepted while in the later phases 2 and 3 the head 31' of a small vehicle occupant 3' can be effectively supported.

The shoulder of a vehicle occupant is generally situated at a smaller distance from the airbag than the head of a vehicle occupant. Utilizing this fact, the airbag 1 and its chambers 15 shown in FIGS. 5a and 5b and FIG. 6a to 6c are designed such that the shoulder of a large vehicle occupant 3 can be supported in an early phase and the head 31' of a small vehicle occupant 3' can be supported in a later phase. At the times the shoulder of the large vehicle occupant 3 or the head 31' of the small vehicle occupant 3' would impact against the airbag, the chamber 15 has the optimum gas pressure P for supporting the shoulder or the head respectively.

As illustrated in FIG. 6a, the airbag 1 is first inflated by the gas generator 4. The gas generator 4 generates different gas jets 41 to 43 that fill the airbag 1 and chambers 15, 16 in such a way that a higher gas pressure P is initially generated in the upper chamber 15 than is generated in the lower chamber 16. This is because the gas jet 41 flowing into the chamber 15 is configured to have a more intense or greater gas flow than the gas jets 42, 43 that are directed into the chamber 16. In the first phase, the chamber 15 is filled with a high gas pressure P and is suitable for intercepting the shoulder of a large vehicle occupant 3 as illustrated in FIG. 5a.

In a second phase following the first phase, the airbag 1 is inflated. In the second phase, there is a pressure difference in the gas pressure P between the chambers 15, 16, and the pressure difference is equalized by the connecting opening 157 between the upper chamber 15 and the lower chamber 16. The connecting opening 157 permits a gas flow between the upper chamber 15 and the lower chamber 16. The connecting opening 157 is a throttle point and its opening dimension allows control of the speed of the pressure equalization.

Alternatively or in addition to the connecting opening 157 between the chambers 15, 16, the airbag may include vent holes that constitute holes in the airbag to the outside and through which a pressure equalization takes place with the external environment. Gas escapes through the vent holes into the environment and the gas pressure P in the chamber 15 that was relatively high in the first phase is equalized. The passage opening 157 between the chambers 15, 16 may be omitted entirely. Vent holes may also be provided in the chamber 16 for a pressure equalization of the chamber 16.

In a third phase that constitutes the termination of the second phase, the pressure difference between the chambers 15, 16 is equalized so a similar gas pressure P prevails in the chambers 15, 16. The gas pressure P in the upper chamber 15 is reduced such that the upper chamber is suitable for intercepting and supporting the head 31' of a small vehicle occupant 3' as per FIG. 5b.

The inflation in the first phase and the pressure equalization in the second phase may take place in a time period on the order of milliseconds so that after a few milliseconds there is a gas pressure prevailing in the first chamber that is suitable for intercepting the head 31' of a small vehicle occupant 3'.

Figure 7C:
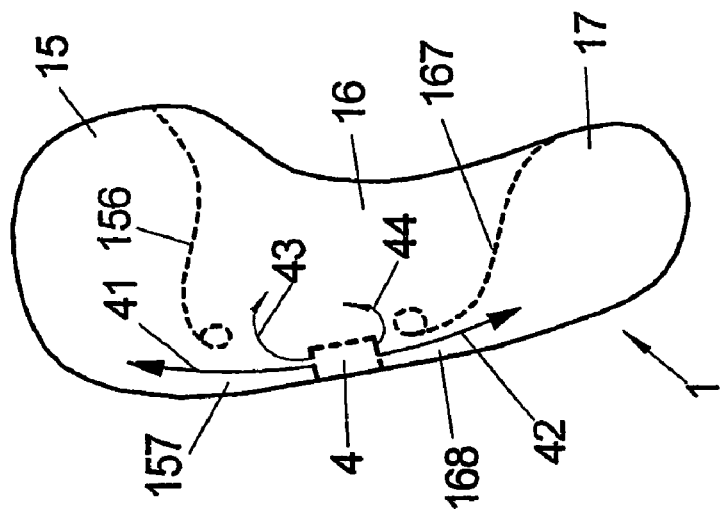
FIGS. 7a-7c are schematic side views of an airbag with a dual-use chamber according to various exemplary embodiments.
Figure 7B:
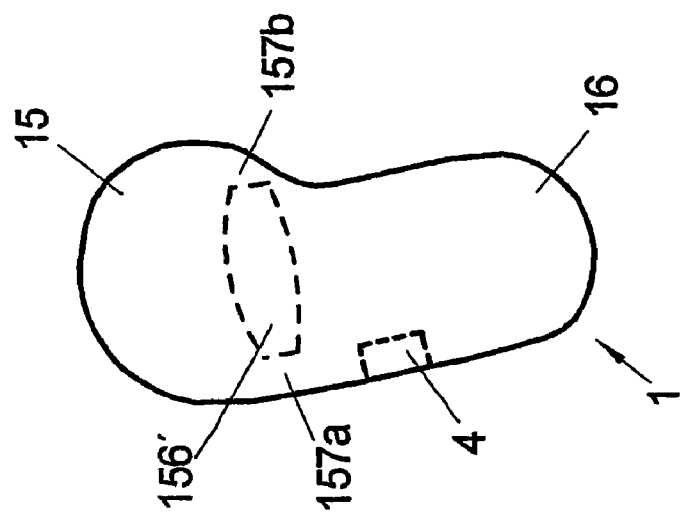
Figure 7A:
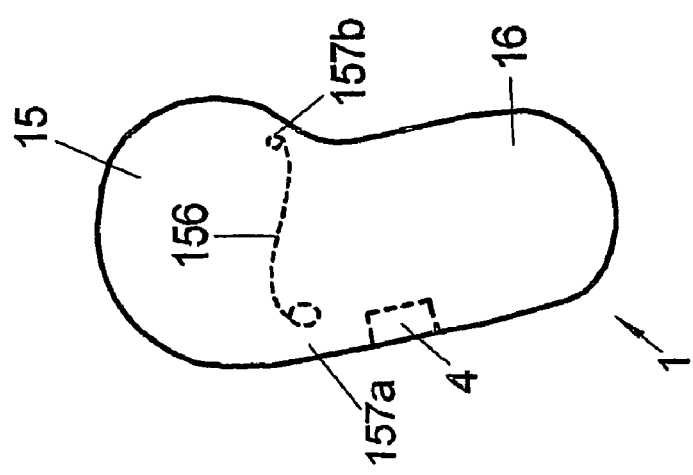

Further exemplary embodiments of the airbag 1 are illustrated in FIGS. 7a to 7c. In the embodiment illustrated in FIG. 7a, two connecting openings 157a, 157b are provided between the upper chamber 15 and the lower chamber 16. The connecting openings 157a, 157b regulate the pressure equalization between the upper chamber 15 and the lower chamber 16 in the second phase as per FIG. 6b.

In FIG. 7b, instead of the seam 156 between the upper chamber 15 and the lower chamber 16, a connecting section 156' in the form of a planar layer is provided between the upper chamber 15 and the lower chamber 16. The planar layer separates the chambers 15, 16 from one another. The connecting openings 157a, 157b may equalize pressure between the chambers 15, 16.

FIG. 7c illustrates an exemplary embodiment of an airbag including an upper chamber 15, a central chamber 16 and a lower chamber 17. The central chamber 16 is configured to support the thorax 32, 32' of a large or small vehicle occupant 3, 3' while the lower chamber 17 covers the region of the pelvis 33, 33' of a large or small vehicle occupant 3, 3'. The gas generator 4 generates gas jets 41 to 44 configured so that in a first phase the upper and lower chambers 15, 17 are inflated with a greater gas pressure P than the central chamber 16. The gas pressure P is then equalized in the subsequent second phase so that in the third phase the same gas pressure prevails in all the chambers 15, 16, 17.

The concept of providing an airbag arrangement having an airbag including at least two chambers with the airbag being inflated in a first phase in such a way that during the first phase the gas pressure in the first chamber is greater than that in a second chamber of the airbag, may also be directly used in the exemplary embodiments of FIGS. 1a, 1b, 2, 3, 8a, 8b and 9, as would be clear to a person skilled in the art. For example, in the exemplary embodiment of FIGS. 8a and 8b, the chambers 18 or 18' and 19 may be inflated with different gas pressures in a phase-dependent fashion. In a first phase, the gas pressure P in the upper chamber 18 or 18' for supporting the upper shoulder region of the vehicle occupant 3 is greater than in the lower chamber 19 or the thorax chamber. In a second phase, the gas pressure in the chamber 18 or 18' is then equalized so that in a third phase the chambers 18 or 18' and 19 have an identical gas pressure and the chamber 18 or 18' is suitable for supporting the head 31 of the vehicle occupant 3. The pressure equalization between the chambers 18 or 18' and 19 may also take place through a passage opening between the chambers 18 or 18' and 19 or through so-called vent holes.

The invention is not restricted to the exemplary embodiments described here, but rather may be used for multiple other airbag arrangements. In particular, it is also conceivable for the invention to be used for airbags that are not arranged on the side of a backrest of a vehicle seat, but that are attached for example in the vehicle door or to the vehicle body.

The priority application, German Patent Application No. 20 2006 010 878.5 filed Jul. 11, 2006, including the specification, drawings, claims and abstract, is incorporated herein by reference in its entirety.

What is claimed is:

1. An airbag arrangement for a vehicle occupant support system, the airbag arrangement comprising:
   an airbag arranged on a side of a backrest of a vehicle seat in such a way that when inflated the airbag extends both in a direction of a vertical vehicle axis and forward from the backrest in a direction of travel of the vehicle, the airbag comprising:
   at least two separate inflatable chambers spaced apart with respect to the vertical vehicle axis, the inflatable chambers at least partially forming an intermediate space, each inflatable chamber extending forward from the backrest in the direction of travel and assigned to a body region of a vehicle occupant to support the vehicle occupant in an event of a side collision, wherein the chambers each comprises a section when the airbag is inflated that extends forward in the direction of travel in such a way that the airbag supports the vehicle occupant in an event that the vehicle occupant moves obliquely forward in the direction of travel, the section intercepting an associated body region of the vehicle occupant, wherein the chambers are connected to one another in a connecting region that permits an exchange of gas between the chambers, wherein an upper one of the chambers comprises a first section adjoining the connecting region, the first section located at a front of the upper chamber in the direction of travel and at a bottom of the upper chamber along the vertical vehicle axis, wherein a lower one of the chambers comprises a second section adjoining the first section, the second section located at a front of the lower chamber in the direction of travel and a top of the lower chamber along the vertical vehicle axis, wherein the upper and lower chambers are arranged one above the other along the vertical vehicle axis, a connecting element between the upper and lower chambers, the connecting element connecting the upper and lower chambers to one another and stabilizing the chambers in the event of a vehicle collision, wherein the connecting element is formed in sections by at least an inflatable chamber, and wherein in the inflated state of the chambers, the chambers are supported against one another via the first and second sections to minimize an intermediate space between the chambers such that the chambers stabilize one another.

2. The airbag arrangement as claimed in claim 1, wherein the airbag is configured in a head-thorax module, and wherein the upper chamber is configured to support a head of the vehicle occupant and the lower chamber is configured to support a thorax of the vehicle occupant.

3. The airbag arrangement as claimed in claim 1, wherein the upper chamber is configured to support a head of the vehicle occupant, and wherein the first section supports the head of the vehicle occupant in an event of a vehicle collision in a direction oblique to a front of the vehicle in the direction of travel.

4. The airbag arrangement as claimed in claim 1, wherein the lower chamber is configured to support a thorax of the vehicle occupant, and wherein the second section supports a shoulder of the vehicle occupant in an event of a vehicle collision in a direction oblique to a front of the vehicle in the direction of travel.

5. The airbag arrangement as claimed in claim 1, wherein the connecting element engages the first and second sections of the chambers that are configured to support a head and a thorax of the vehicle occupant.

6. The airbag arrangement as claimed in claim 1, wherein the connecting element is formed in sections by at least a planar layer.

7. The airbag arrangement as claimed in claim 1, wherein the connecting element is configured such that when the airbag is inflated the connecting element is braced between a shoulder of the vehicle occupant and a part of the vehicle body to stabilize the at least two chambers that are connected by the connecting element.

8. The airbag arrangement as claimed in claim 1, wherein one of the chambers of the airbag is configured to support a thorax of the vehicle occupant if the vehicle occupant is larger than a 50th percentile crash dummy with average body dimensions and is configured to support a head if the vehicle occupant is smaller than the 50th percentile crash dummy with average body dimensions.

9. The airbag arrangement as claimed in claim 8, wherein the airbag arrangement is configured to inflate the airbag in a first phase so that a gas pressure is greater in the first chamber than in a second chamber of the airbag during the first phase.

10. The airbag arrangement as claimed in claim 1, wherein, in the inflated state of the chambers, the chambers are supported against one another via the first and second sections such that the intermediate space between the chambers is closed.

11. The airbag arrangement as claimed in claim 1, wherein, in the inflated state of the chambers, the first and second sections abut against one another such that the intermediate space between the chambers is minimized.

12. An airbag module configured to be located in a backrest of a vehicle seat, the module comprising:
  a gas generator; and
  an airbag configured to be inflated by gas supplied from the gas generator, wherein the airbag is configured to deploy both vertically upward and forward and wherein the airbag includes:
    at least two separate inflatable chambers spaced apart with respect to a vertical vehicle axis, the inflatable chambers at least partially forming an intermediate space, each inflatable chamber extending forward from the backrest in a direction of travel and assigned to a body region of a vehicle occupant to support the vehicle occupant in an event of a side collision,
  wherein the chambers each comprises a section when the airbag is inflated that extends forward in the direction of travel in such a way that the airbag supports the vehicle occupant in an event that the vehicle occupant moves obliquely forward in the direction of travel, the section intercepting an associated body region of the vehicle occupant,
  wherein the chambers are connected to one another in a connecting region that permits an exchange of gas between the chambers,
  wherein an upper one of the chambers comprises a first section adjoining the connecting region, the first section located at a front of the upper chamber in the direction of travel and at a bottom of the upper chamber along the vertical vehicle axis,
  wherein a lower one of the chambers comprises a second section adjoining the first section, the second section located at a front of the lower chamber in the direction of travel and a top of the lower chamber along the vertical vehicle axis,
  wherein the upper and lower chambers are arranged one above the other along the vertical vehicle axis, a connecting element between the upper and lower chambers, the connecting element connecting the upper and lower chambers to one another and stabilizing the chambers in the event of a vehicle collision, wherein the connecting element is formed in sections by at least an inflatable chamber, and
  wherein in the inflated state of the chambers, the chambers are supported against one another via the first and second sections to minimize an intermediate space between the chambers such that the chambers stabilize one another.

* * * * *